Dec. 22, 1964     H. H. SCHAPANSKY     3,162,003
METHOD AND MECHANISM FOR HARVESTING AND GRADING ALFALFA
Filed June 29, 1962     2 Sheets-Sheet 1

INVENTOR.
HENRY H. SCHAPANSKY
BY
Hansen and Lane
HIS ATTORNEYS.

Dec. 22, 1964  H. H. SCHAPANSKY  3,162,003
METHOD AND MECHANISM FOR HARVESTING AND GRADING ALFALFA
Filed June 29, 1962  2 Sheets-Sheet 2
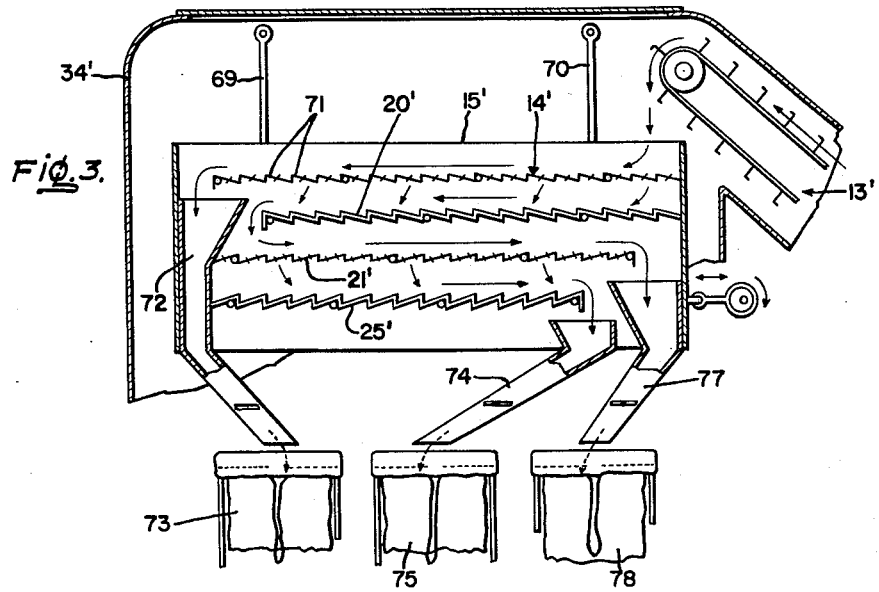
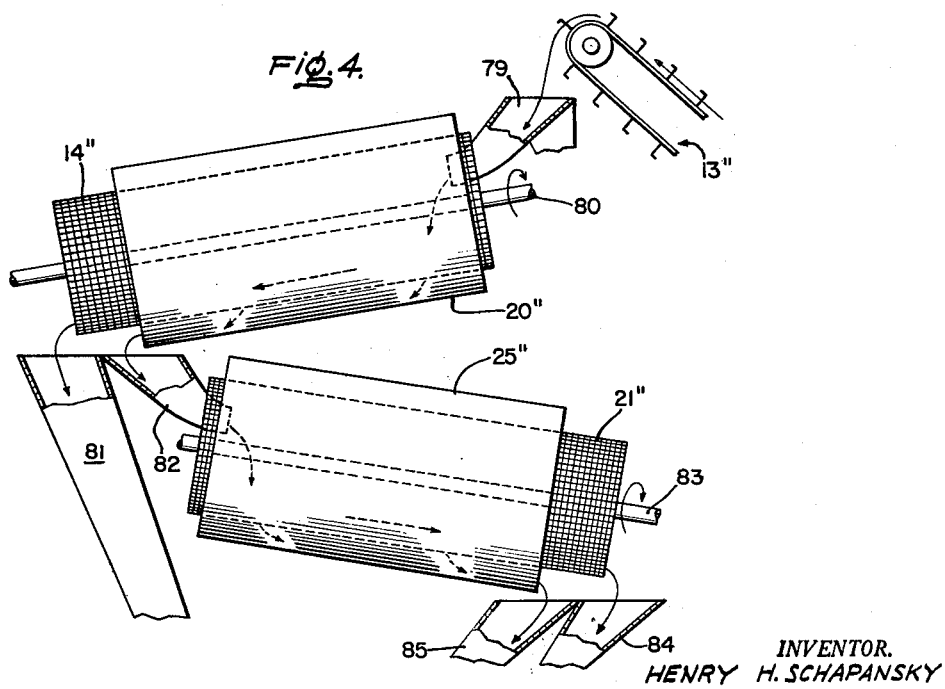
INVENTOR.
HENRY H. SCHAPANSKY
BY
Hausen and Lane
HIS ATTORNEYS.

United States Patent Office 3,162,003
Patented Dec. 22, 1964

3,162,003
METHOD AND MECHANISM FOR HARVESTING AND GRADING ALFALFA
Henry H. Schapansky, 440 Patch Ave., San Jose, Calif.
Filed June 29, 1962, Ser. No. 206,357
3 Claims. (Cl. 56—19)

The present invention relates to alfalfa harvesting, and pertains more particularly to a machine and method for field harvesting and grading alfalfa.

In the past it has been the practice in harvesting alfalfa, to first mow it, then rake it into windrows, and then bale it from these windrows. If the alfalfa was to be subsequently shreded or ground, such additional steps have been performed by transporting the baled alfalfa to a mill, breaking open the bales, feeding the alfalfa to a hammer mill, grinder or chopper, and then blowing the resultant reduced material by means of an air blast from a blower. However, as far as is known, even this treatment was not successful for grading or separating different components of the alfalfa.

The present invention provides for the reduction and subsequent grading of alfalfa into a plurality of grades by mechanism operating in the field, whereby the alfalfa picked up from windrows in the field, is fed to a reducing mechanism, such as a hammer mill, grinder or chopper, and the resultant reduced material is graded as required without the use of blower mechanism.

The invention also provides for the field processing of alfalfa by picking up and elevating air dried alfalfa from windrows, passing the alfalfa thus picked up into a reducing mechanism which cuts or breaks up the stems, leaves and flowers of the dried alfalfa, after which the resultant particles are transferred to a screening mechanism which first screens out the medium size and smaller particles and retains thereon the larger particles, principally the stems, and the remaining material is then rescreened to separate the medium size and smallest particles.

A further object of the invention is to provide an improved alfalfa field processing and grading method and mechanism.

These, and other objects and advantages of the invention, will be apparent from the following description and the accompanying drawings, wherein:

FIG. 3 is a fragmentary, somewhat diagrammatic, side elevational view of a modified form of shaker screen structure capable of being substituted for that of the mechanism shown in FIGS. 1 and 2, portions being broken away.

FIG. 4 is a fragmentary, somewhat diagrammatic, side elevational view of a rotary screening structure capable of being substituted for the screening structure shown in FIGS. 1 and 2, portions being broken away.

Figure 1:
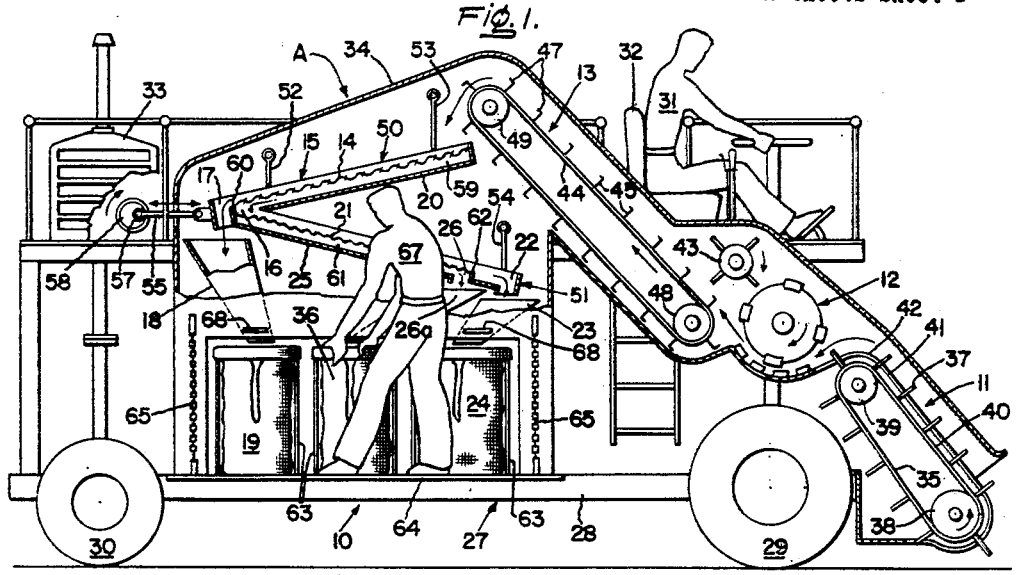
FIG. 1 is a somewhat diagrammatic, side elevational view of a mechanism for practicing the invention, portions being broken away.
Figure 2:
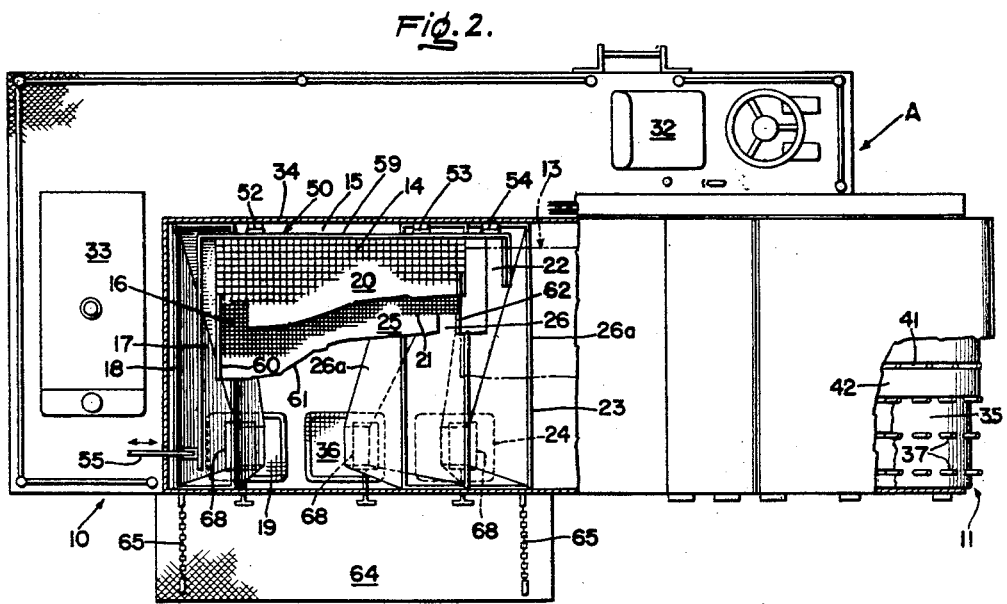
FIG. 2 is a plan view of the mechanism shown in FIG. 1, portions being broken away.

Briefly, the mechanism A shown in FIGS. 1 and 2 comprises a self-propelled, wheeled vehicle 10 adapted to be driven across a field having windrows of properly air dried alfalfa thereon. The machine A is provided with means 11 for picking up the alfalfa (not shown) as the machine is driven along a windrow, and elevating the alfalfa thus picked up into a suitable reducing mechanism 12. For the purposes of the present descirption and claims, the terms "reducing mechanism," "reducing" etc. is intended to mean the processing of the alfalfa so as to break, cut, grind, hammer or otherwise treat it so that the stem portions are reduced to portions of a required maximum or average length, for example, one and one half inches, although this length is not critical. In this reducing process, the more fragile flowers and leaves of the dried alfalfa are reduced to particles of much smaller size.

The resultant particles of alfalfa are discharged from the reducing mechanism 12 in the direction of the arrow adjacent thereto in FIG. 1, where a conveyor 13 receives the alfalfa particles, carries them upwardly and discharges them onto the upper end of the uppermost, coarser, sloping screen 14 of an oscillating screen structure 15. The portion of this material (mostly stems) remaining on the upper screen 14 at its lower end drops through a discharge opening 17 into a chute 18, through which it gravitates to suitable receiving means, such as a bag 19.

The portion of the reduced alfalfa material which passes through the upper screen 14 gravitates off the lower end of a sloping catch board 20 provided therebeneath, and through an opening 16 onto the upper end of a finer mesh, lower, sloping screen 21. The intermediate size particles of the material remaining on the second screen 21 at its lower end drop through a discharge opening 22, and thence gravitate through a chute 23 into second receiving means, such as a bag 24.

The most finely divided particles of the reduced alfalfa material, which pass through the lower, finer screen 21, gravitate down a second sloping catchboard 25 provided therebeneath, and thence through a discharge opening 26 and chute 26a into third receiving means, such as a bag 36. Thus, the field dried alfalfa is completely processed and graded directly from windrows thereof in the field.

Referring to the drawings in greater detail, the mechanism A illustrated in FIGS. 1 and 2 for practicing the invention comprises a vehicle chassis 27 having a usual frame 28, and front and rear support wheels 29 and 30. The former are dirigible, and are steered by conventional, automotive type steering means by an operator 31 riding in a driver's station 32 provided on the vehicle. The rear wheels 30 are controllably driven by conventional, automotive type transmission mechanism (not shown) from a suitable prime mover, such as an internal combustion engine, housed in a compartment 33. The alfalfa handling and processing mechanism of the machine A is housed in a body or housing 34 of conventional sheet metal construction of the general type employed in harvesting machines of this general character.

At the forward end of the vehicle A, the alfalfa pick-up and elevating means 11 is of a type commonly employed for picking up windrowed material, such as hay or grain, from a field. This pick-up means 11 comprises a wide belt 35, which may be of conventional rubber and fabric construction, with rows of pins 37 projecting from its outer surface. The belt is passed around two rollers 38 and 39, one of which is driven in a conventional manner by suitable drive mechanism, either from the vehicle engine in the housing 34, or from an auxiliary power plant (not shown) if the latter is provided.

It is immaterial to the present invention whether the machine A is self propelled, or is drawn by another vehicle, such as a tractor. Also, whether the alfalfa handling and processing mechanisms on the machine are driven from the vehicle propulsion engine, or from an auxiliary power plant. Since such drive mechanisms are well known, and the manner of providing them is well within the capabilities of an ordinary worker or engineer familiar with harvesting mechanism, the details thereof are omitted as being unnecessary to the present description.

Each row of pins 37 on the upward run 40 of the belt 35 rides in a slot 41 provided therefore in a sheet metal plate 42 which is secured to extend transversely between the sides of the vehicle housing 34. Rearwardly adjacent the upper end of the slotted plate 42, and positioned to receive the alfalfa elevated by the mechanism 11, is the reducing mechanism 12 for dividing the alfalfa as it is fed thereto.

The reducing mechanism 12 illustrated is a hammer mill, although the specific type of mechanism employed for cutting up, chopping or breaking up the alfalfa is not essential to the invention. Due to the inherently greater fragility of the leaves and flowers of the alfalfa as compared to the stems, any such reducing mechanism will, of course, reduce the leaves and flowers of the field dried alfalfa to a much more finely divided state or condition than the stems.

A paddle wheel 43, rotating in the direction indicated by the curved arrow adjacent thereto in FIG. 1, preferably is provided substantially as illustrated to prevent alfalfa particles from the reducing mechanism 12 from being carried upwardly around the reducing mechanism, and to direct such particles downwardly and forwardly onto the lower end of the conveyor 13.

The latter comprises a wide belt 44, which may be of conventional rubber and fabric construction, which extends between the sides of the housing 34, and is provided with a plurality of flights or vanes 45 projecting from its outer surface. An outer end portion 47 of each vane 45 is bent over in the direction of belt travel as indicated by the arrow in FIG. 1 so as to scoop or pick up the alfalfa particles which are discharged toward it by the reducing mechanism 12. The conveyor belt 44, like the pick up belt 35, passes around a pair of rollers 48 and 49, one of which is driven by suitable mechanism (not shown) as explained previously herein for the pick up belt 35.

The upper end of the conveyor belt 44 is positioned to discharge the reduced alfalfa material conveyed thereby from the reducing mechanism 12, and to discharge it onto the upper end of the upper screen 14 of the two-stage screen structure 15. This screen structure 15 comprises an upper, sloping portion 50, and a lower, oppositely sloping portion 51. The two sloping screen portions of the illustrated machine A are rigidly, and substantially integrally, interconnected at their intersection.

The screen structure 15 is suspended from the machine housing 34 for longitudinal oscillation on three, laterally opposite pairs of suspension links 52, 53 and 54. The upper end of each of these links is pivotally connected to the machine housing 34, while their lower ends are pivotally connected to the screen structure 15. A screen oscillating drive link 55 is pivotally connected to one end of the screen structure 15, while the other end of this drive link is journaled on an eccentric pin 57 on a rotary shaft 58. The shaft 58 is driven in a conventional manner, and at a desired speed, either from the propulsion engine of the vehicle A, or from a suitable auxiliary power mechanism (not shown) if the latter is provided.

The upper, sloping portion 50 of the screen structure 15 comprises a rectangular frame 59, with the coarser screen 14, for example, ¼" mesh, spaced downwardly from the upper edge of the frame, and upwardly from the catch board 20 which covers the under side of this frame 59 from its upper end to the upper edge of the discharge opening 16. The upper screen 14 extends from the upper end of the frame 59, the full width of said frame to a transverse frame member 60. The latter is spaced upwardly from the lower end of the frame 59 between the discharge openings 16 and 17. The upper screen 14 is disposed at a desired angle of inclination for example, twenty degrees from the horizontal.

The portion of the reduced alfalfa material which still remains on the upper screen 14 at its lower end, drops through the discharge opening 17 into the chute 18 provided therebeneath, while the remainder of this material, which passes through the upper screen 14, gravitates down the sloping catch board 20 and through the discharge opening 16 onto the upper end of the screen 21 of the lower sloping portion 51 of the screening structure 15. The lower sloping portion 51 comprises a rectangular frame 61, with the finer mesh screen 21, of, for example, ½₂" mesh, spaced downwardly from the upper edge of said frame and upwardly from the catch board 25. The latter covers the under side of the frame 61 from the transverse frame member 60 to the upper edge of the discharge opening 26.

The lower screen 21 extends the full width of the frame 61 from the lower end of the upper catch board 20 to a transverse frame member 62, which is spaced upwardly from the lower end of the frame 61 to provide the discharge opening 22. The lower screen 21 also is disposed at a required slope, for example, approximately 25° from the horizontal.

The chutes 18, 23 and 26a are provided, one beneath each of the discharge openings 17, 22 and 26. These chutes slope toward a side of the machine A, and their lower ends are positioned to discharge the material gravitating therethrough into their repective bags 19, 24 and 36. These bags are supported in conventional bag racks 63 provided therefor on the machine A.

A hinged platform 64 is provided on the side of the machine A toward which the chutes 18, 23 and 26a are directed, and swings between a position closely alongside the housing 34 of the machine A, to the horizontal position thereof illustrated in FIGS. 1 and 2. Chains 65 connected between the housing 34 and the platform 64, support the latter in its lowered, horizontal position, to support an operator 67 working thereon.

The operator 67 removes each bag as it becomes filled, and replaces it with a fresh, empty bag. He then ties off the filled bags in a conventional manner and drops them off the platform 64 onto the ground, where they may be picked up by a conventional truck or other vehicle.

In order to prevent loss of material while the operator is replacing a filled bag with an empty bag, each of the chutes 18, 23 and 26a is preferably provided with a sliding gate 68 therein. Before removing a filled bag from its rack, the operator closes the gate associated therewith to stop the flow of material through the chute. When such filled bag has been replaced by an empty one, he reopens the gate to permit the material to again gravitate through the chute and into the bag.

Instead of employing the illustrated form of receiving means, a suitable conveyor means (not shown) may be provided to receive the material from each of the discharge openings 17, 22 and 26, and such conveyor means may be directed into separate bins in a truck (not shown) driven alongside the machine A in the field. Since the structural details and operation of such mechanism for the transferring of harvested material from a harvester to a truck bin in this general manner is well known, for example in the operation of headers for wheat and barley, it will be unncessary to illustrate or describe such alternate receiving means in detail.

In using the present invention, the alfalfa to be processed is mowed by conventional mowing mechanism, is allowed to air dry in the field, and is collected in windrows by conventional rakes or other windrowing mechanisms. With the air dried alfalfa in windrows, the machine A is driven along a selected windrow with the pick-up means 11, the reducing mechanism 12, the conveyor 13, and the screen structure 15 all operating at desired speeds. The windrowed alfalfa is picked up by the pins 37 on the belt 35 and is carried by said pins up along the slotted plate 42.

At the upper end of the slotted plate 42 the alfalfa is fed into the reducing mechanism 12, which breaks, chops or grinds the alfalfa so as to reduce the stem portions thereof into pieces having a required maximum or average length, for example, of the order of one or two inches. In so reducing the stems, the reducing mechanism 12, breaks up the more delictae leaves and flowers of the plants into more finely divided bits and pieces.

The resultant reduced alfalfa material is picked up by the conveyor 13, which conveys it upwardly and dumps said material over the upper end of the conveyor 13 onto the upper end of the coarse upper screen 14 of the screen structure 15.

This screen structure 15, oscillating under the impulse of its drive link 55 from the eccentric pin 57 on the rotary shaft 58, agitates the reduced alfalfa material fed thereto and causes it to gravitate downwardly along the coarser upper screen 14. The smaller bits and pieces of the reduced alfalfa material pass through the openings in this upper screen 14, while the larger portions thereof, mostly stems, remain thereon. These larger portions of the material remaining on the upper screen 14 gravitate through the discharge opening 17 at its lower end into the chute 18 and thence into a bag 19 supported on the rack 63.

The portion of the material which passes through the large mesh upper screen 14 and falls onto the upper catch board 20, gravitates therealong and through the discharge opening 16 at its lower end onto the upper end of the finer mesh lower screen 21. Here the agitation continues, and the smallest particles of the reduced alfalfa material thereon pass through the openings in the lower screen 21 onto the lower catch board 25. This portion of the material which passes through the lower screen 21 drops onto the catch board 25 therebeneath and gravitates therealong and through the opening 26 at its lower end.

The remainder of the reduced alfalfa material, being the intermediate size particles, which does not pass through the lower screen 21, drops through the discharge opening 22 at its lower end and gravitates through the chute 23 into the bag 24.

For the purposes of the present description, the three grades of material produced by the operation of the machine A are designated as follows: "Grade 1," the finest grade of material, i.e. that which passes through both screens 14 and 21 and into bag 36; "Grade 2," the intermediate grade, i.e., that which passes through the first screen 14 and not the second screen 21, and into bag 24; "Grade 3," the coarsest grade (mostly stems) i.e. that which remains on the upper screen 14 and passes into bag 19.

It has been found that in a machine such as the machine A of FIGS. 1 and 2, with ¼" openings in the upper screen 14, and $\frac{1}{32}$" openings in the lower screen 21, with the upper screen 14 inclined at an angle of 20 degrees from the horizontal, front to rear, and the lower screen 21 inclined at an angle of 25 degrees from the horizontal in the opposite direction, and with the screen structure 15 oscillating at a rate of approximately 120 cycles per minute, and the alfalfa reduced in the hammer mill 12 to a condition where the longest stem portions are approximately one and one half to two inches in length; approximately 50 percent by weight of the reduced alfalfa material will be Grade 1 material, approximately two thirds of the remainder, or ⅔ of the total will be Grade 2 material, and the remainder, constituting one sixth of the total, will be Grade 3 material.

In chemical tests of such resultant three grades of material, the following results were obtained: Grade 1, dry matter 89.4%, crude fiber 13.2%, estimated digestible protein 20%, estimated total digestible nutrients (TDN) 61%; Grade 2, dry matter 89.2%, crude fiber 31.2% estimated digestible protein 10.1%, estimated total digestible nutrients (TDN) 45%; Grade 3 (stems), dry matter 89.2%, crude fiber 38.9%, estimated digestible protein 6.4%, estimated total digestible nutrients (TDN) 39%.

It is obvious that by changing the mesh sizes of the screens 14 and 21, as well as by changing their inclination or slope and the oscillation rate of the screening structure 15, or of the individual screens, the proportions and character of the grades of material produced can be changed. However, the screen meshes, screen slopes, and rate of oscillation set forth in the example given provide a very desirable grade separation.

The Grade 1 material produced by the mechanism of this example constitutes 50% by weight of the reduced alfalfa material processed. This Grade 1 material contains an extremely high percentage of digestible protein and total digestive nutrients (TDN). It is, therefore, excellent for feeding to heavily producing diary herds, and for pelletizing for use as chicken and rabbit food. The Grade 2 material, which constitutes two sixths of the total by weight, while much lower in digestible protein and TDN than Grade 1, is still satisfactory for feeding to light or medium producing dairy stock and many other uses. The Grade 3 material, which constitutes only ⅙ of the total by weight, consists mostly of stems and is suitble fodder for non-producing stock.

The particular type of screening mechanism employed is not essential to the invention, and FIGS. 3 and 4 show suitable alternate types of screening structures. In FIG. 3 a screen structure 15' is suspended for longitudinal oscillation on two opposite pairs of links 69 and 70. The upper end of each of these links is pivotally connected to a housing 34', corresponding to the housing 34 of FIGS. 1 and 2, and their lower ends (not shown) are pivotally connected to the screen structure 15'.

An upper, coarse mesh screen 14', corresponding to the upper screen 14 of FIGS. 1 and 2, is positioned to receive the reduced alfalfa material from the conveyor 13', which is similar to the conveyor 13, identified by the same basic reference numeral 13, in FIG. 1. The upper screen 14' is formed in transverse steps 71, in a manner well known in harvesting machines, so that as the screen structure 15' is oscillated lengthwise of the machine in which it is mounted, reduced alfalfa material on the screen 14' will be progressively urged rearwardly, or toward the left, as illustrated in FIG. 3. The coarsest, or Grade 3 material remains on the upper screen 14' at its left hand or terminal end is discharged through a chute 72 into a bag 73.

The portion of the material which passes through the upper screen 14' drops onto a step-formed, imperforate, catch plate 20', is moved to the left thereon by the oscillations of the screen structure 15', to which it is secured, and is discharged off the left hand end of the catch plate 20' onto a second, finer screen 21', corresponding to the lower screen 21 of the mechanism shown in FIGS. 1 and 2. This lower screen 21' is also step-formed, and operates to move and screen the material thereon similarly to the upper, coarser screen 14'. This lower screen 21' screens out the finest, or Grade 1 material which gravitates therethrough onto the step-formed catch plate 25' therebeneath, and is moved toward the right thereon by the oscillations of the screen structure 15'. This finest, or Grade 1 material is discharged through a chute 74 into a bag 75. The Grade 2 material which remains on the second screen 21' until it is discharged off the right hand end thereof, gravitates through a chute 77 and into a bag 78.

A rotary screen mechanism 15" is shown in FIG. 4. The chopped or reduced alfalfa material is discharged, by a conveyor 13", in the manner explained previously herein in connection with the conveyor 13 of FIGS. 1 and 2, into a chute 79. The material gravitates through the chute 79 into a coarse mesh, rotary, cylindrical upper screen 14" corresponding to the upper screen 14 of FIGS. 1 and 2. The upper screen cylinder 14" is mounted coaxially on a rotary shaft 80, the axis of which is tilted from the inlet toward the outlet end of the screen 14" at a desired angle to produce a required rate of flow of the reduced alfalfa material therethrough, for example 20° and 25°, respectively, from the horizontal. This upper screen 14" is surrounded by an imperforate, cylindrical shell 20", which may be of sheet metal, and corresponds, functionally, to the upper catch board 20 of FIGS. 1 and 2. The shell 20″ is spaced outwardly from the screen 14″, and is secured co-axially to the shaft 80 to rotate therewith.

The reduced alfalfa material which is retained within the upper cylindrical screen 14″, being grade 3 material, is discharged from the lower end thereof through a chute 81 into suitable receiving means, not shown. The material which passes through the upper screen 14″ is caught by the shell 20″, and gravitates therealong and into the upper end of a second chute 82, which directs this material into the interior of a second, lower rotary screen 21″. This second screen 21″, which corresponds to the lower screen 21 of FIGS. 1 and 2, is mounted co-axially on a second rotary shaft 83. The latter is also axially tilted from the horizontal at a suitable angle, for example 20°. The second screen 21″, like the first 14″, is surrounded by a co-axial, imperforate shell 25″, which is mounted to rotate with the shaft 83 and the screen 21″.

The material which is retained within the second cylindrical screen 21″, being the Grade 2 material, gravitates out of the lower end thereof and through a chute 84 into suitable receiving means (not shown). The material which passes through the second screen 21″, being the Grade 1 material, is caught by the shell 25″, gravitates along it, and is discharged from its lower end into a chute 85.

The invention provides a simple, rapid, inexpensive method and mechanism for the field processing and grading of alfalfa. A very high proportion of the resultant material is the Grade 1 material, which is of high nutritional value, and therefore commands a relatively high price. The invention also provides for the processing and grading of alfalfa directly in the field, with a resultant substantial saving in time and cost over previous methods for producing reduced and graded alfalfa.

While I have illustrated and described a preferred embodiment of the present invention, and two modified forms thereof, it will be understood, however, that various changes and modifications may be made in the details thereof without departing from the scope of the invention as set forth in the appended claims.

Having thus described the invention, what I claim as new and desire to protect by Letters Patent is defined in the following claims:

1. An alfalfa field harvesting and grading machine comprising a wheeled vehicle, means for moving and guiding the vehicle along a windrow of air dried alfalfa in a field, pickup mechanism on the vehicle for picking up such alfalfa from such windrow, power driven reducing mechanism on the vehicle positioned to receive such alfalfa from the pickup mechanism, said reducing mechanism operating to reduce the alfalfa to a condition wherein the stems thereof are of short length, thereby reducing the more fragile leaf and flower portions of such alfalfa to particles smaller than the stem particles, first, power driven, coarser screening means on the vehicle, means for transferring such reduced alfalfa from the reducing mechanism to the first, coarser screening means, the latter having a mesh size to retain thereon a major portion of the stem particles of such reduced alfalfa and to pass the remainder thereof therethrough, first receiving means on the vehicle for receiving the portion of the reduced alfalfa retained on the first, coarser screening means, second, power driven, finer screening means on the vehicle, means for transferring the portion of the reduced alfalfa which passes through the first, coarser screening means to the second, finer screening means, the latter having a mesh size to retain thereon intermediate size particles of such reduced alfalfa and to pass the remainder thereof therethrough, second receiving means on the vehicle for receiving the portion of the reduced alfalfa retained on the second screening means, and third receiving means on the vehicle for receiving the remainder of the reduced alfalfa which passes through the second screening means.

2. An alfalfa field harvesting and grading machine comprising a wheeled vehicle, means for moving and guiding the vehicle along a windrow of air dried alfalfa in a field, pickup mechanism on the vehicle for picking up such alfalfa from such windrow, power driven reducing mechanism on the vehicle positioned to receive such alfalfa from the pickup mechanism, said reducing mechanism operating to reduce the alfalfa to a condition wherein the stems thereof are of short length, thereby reducing the more fragile leaf and flower portions of such alfalfa to particles smaller than the stem particles, first, power driven, coarser screening means of approximately $\frac{1}{4}$ inch mesh size on the vehicle, means for transferring such reduced alfalfa to the first, coarser screening means, first receiving means on the vehicle for receiving the portion of the reduced alfalfa retained on the first, coarser screening means, second, power driven, finer screening means of approximately $\frac{1}{32}$ inch mesh size on the vehicle, means for transferring the portion of the reduced alfalfa which passes through the first, coarser screening means to the second, finer screening means, second receiving means for receiving the portion of the reduced alfalfa retained on the second screening means, and third receiving means for receiving the remainder of the reduced alfalfa which passes through the second screening means.

3. The method of harvesting and grading cut, field dried alfalfa which comprises picking up the air dried alfalfa from windrows thereof in a field, reducing the alfalfa at once and in the field to particles wherein the stems of the alfalfa are reduced to lengths of the order of a few inches or less, and the flowers and leaves of the alfalfa, being more fragile than the stems, are simultaneously reduced to particles of smaller size, screening off at once and in the field without air blast a major portion of the reduced stem particles of the reduced alfalfa comprising low nutrient elements and transferring such screened off stem particles to a receiver, screening off at once and in the field from the portion of the reduced alfalfa remaining after the removal of the low nutrient stem particles intermediate size particles of the reduced alfalfa comprising medium to high nutrient elements and transferring such intermediate size particles to a second receiver, and transferring to a third receiver at once and in the field the finely divided, high nutrient particles of the reduced alfalfa remaining after the screening off of the stem particles and intermediate size particles.

References Cited by the Examiner
UNITED STATES PATENTS

| 1,091,275 | 3/14 | Benson | 209—316 X |
| 2,269,298 | 1/42 | Widuch | 171—132 X |
| 2,354,376 | 7/44 | Johnson | 209—316 |
| 2,699,031 | 1/55 | MacDonald | 56—364 |
| 2,974,467 | 3/61 | Long | 56—19 |

T. GRAHAM CRAVER, *Primary Examiner.*

ANTONIO F. GUIDA, *Examiner.*